(12) United States Patent
Jarrett

(10) Patent No.: US 7,776,377 B2
(45) Date of Patent: *Aug. 17, 2010

(54) NON-DAIRY, NON-SOY FOOD PRODUCT AND METHODS OF MAKING

(75) Inventor: Rose Anne Jarrett, Oxford, NJ (US)

(73) Assignee: Green Rabbit, LLC, Albany, NY (US)

( * ) Notice: Subject to any disclaimer, the term of this patent is extended or adjusted under 35 U.S.C. 154(b) by 572 days.

This patent is subject to a terminal disclaimer.

(21) Appl. No.: 11/539,834

(22) Filed: Oct. 9, 2006

(65) Prior Publication Data

US 2007/0134399 A1    Jun. 14, 2007

Related U.S. Application Data

(63) Continuation-in-part of application No. 11/071,077, filed on Mar. 3, 2005, now Pat. No. 7,592,030, and a continuation-in-part of application No. 11/438,525, filed on May 22, 2006, now Pat. No. 7,507,432, which is a continuation-in-part of application No. 11/071,077.

(51) Int. Cl.
*A23L 1/36* (2006.01)

(52) U.S. Cl. .................. 426/629; 426/549; 426/598; 426/661

(58) Field of Classification Search ............ 426/74, 426/620, 615, 640, 639, 658, 548, 629, 661, 426/664, 518, 519, 549, 598
See application file for complete search history.

(56) References Cited

U.S. PATENT DOCUMENTS

| | | | | |
|---|---|---|---|---|
| 2,984,543 | A * | 5/1961 | Smith et al. | 423/268 |
| 4,244,981 | A | 1/1981 | Blake | |
| 4,335,155 | A | 6/1982 | Blake et al. | |
| 4,368,211 | A | 1/1983 | Blake et al. | |
| 4,609,561 | A | 9/1986 | Wade et al. | |
| 4,643,906 | A | 2/1987 | Pitz | |
| 4,744,992 | A | 5/1988 | Mitchell et al. | |
| 4,800,097 | A * | 1/1989 | Morris et al. | 426/632 |
| 4,894,242 | A | 1/1990 | Mitchell et al. | |
| 4,908,223 | A | 3/1990 | Murtaugh et al. | |
| 4,948,614 | A | 8/1990 | Feldpausch | |
| 5,059,442 | A | 10/1991 | Klemann et al. | |
| 5,084,295 | A | 1/1992 | Whelan et al. | |
| 5,098,731 | A | 3/1992 | Feldpausch | |
| RE34,508 | E | 1/1994 | Murtaugh et al. | |
| 5,408,922 | A * | 4/1995 | Gupta | 99/483 |
| 6,010,734 | A | 1/2000 | Whelan et al. | |
| 6,197,362 | B1 | 3/2001 | Hussein | |
| 6,368,653 | B1 | 4/2002 | Heertje et al. | |
| 6,376,002 | B1 | 4/2002 | Ryu et al. | |
| 6,511,694 | B2 | 1/2003 | Huang et al. | |
| 6,569,485 | B2 | 5/2003 | Hussein | |
| 7,507,432 | B2 * | 3/2009 | Jarrett | 426/629 |
| 2001/0005524 | A1 | 6/2001 | Hussein | |
| 2003/0003215 | A1 | 1/2003 | Huang et al. | |
| 2003/0031758 | A1 | 2/2003 | Koss et al. | |
| 2003/0207016 | A1 | 11/2003 | Hussein | |
| 2006/0198937 | A1 * | 9/2006 | Jarrett | 426/570 |

FOREIGN PATENT DOCUMENTS

| | | |
|---|---|---|
| JP | 54-138135 | 10/1979 |
| JP | 55-159774 | 12/1980 |
| JP | 2003-325147 | 11/2003 |

OTHER PUBLICATIONS

Cole, C. Nut Milks! Woodbridge Press Publishing Co. 1990, P. 0. Box 6189, Santa Barbara, CA 93160, pp. 57, 59, 61, 73.*
Davis, et al, "Dairy-free & delicious," pp. 54, 56, 57, 64, 65 & 72, Book Publishing Co., (2001).
First Glance and Oat Supreme Ice Cream—ingredients and nutritional information. [on-line] [retrieved on Dec. 20, 2005]. Retrieved from the Internet: <URL: www.first-foods.com/icecreamingred.htm>.
FreeZees. [on-line] [retrieved Dec. 20, 2005]. Retrieved from the Internet: <URL: www.freezees.com/productsprint.html>.
Klein's Kosher Ice Cream. [on-line] [retrieved on Dec. 20, 2005]. Retrieved from the Internet: <URL: www.koshericecream.com/product.asp?id=26&subid=&productID=198>.
Kupstas Soo, Eileen: Home Page, Recipes, *Misc. kids Frequently Asked Questions: Allergies and Asthma* p. 35, University of North Carolina at Chapel Hill, Dept. of Computer Science, downloaded online @ http://www.cs.unc.edu/~kupstas/FAQ_recipes.html; accessed Sep. 20, 2006.
Rice Dream Non-Dairy Frozen Dessert. [on-line] [retrieved on Dec. 20, 2005]. Retrieved from the Internet: <URL: www.tastethedream.com/pages/products/ricedreamfrozen.php>.
Rogers, J., *Vice Cream Over 70 Sinfully Delicious Dairy-Free Delights*, Celestial Arts, California (2004).
Tofutti Premium Pints Vanilla. [on-line] [retrieved on Dec. 20, 2005]. Retrieved from the Internet: <URL: www.tofutti.com/pictures/pp_pp_vanilla_02.gif>.
Vegetarian Reading. [on-line] [retrieved on Dec. 20, 2005]. Retrieved from the Internet: <URL: www.vegparadise.com/vegreading66.html>.
VRG Journal Jul. 1993. [on-line] [retrieved on Dec. 20, 2005]. Retrieved from the Internet on Dec. 20, 2005. Retrieved from the Internet: <URL: www.vrg.org/journal/93jul.htm>.

* cited by examiner

*Primary Examiner*—Helen F Pratt
(74) *Attorney, Agent, or Firm*—Maxine Barasch & Associates, PLLC

(57) ABSTRACT

A food composition or product is described comprising a finely ground nut-seed component, a liquefying agent, and salt, combined with (a) baking soda and a starch; or (b) at least one sweetening agent; or (c) baking soda, a starch and at least one sweetening agent.

26 Claims, No Drawings

NON-DAIRY, NON-SOY FOOD PRODUCT AND METHODS OF MAKING

CROSS REFERENCE TO RELATED APPLICATION

This application is a continuation-in-part of U.S. application Ser. No. 11/071,077 filed Mar. 3, 2005 now U.S. Pat. No. 7,592,030 and U.S. application Ser. No. 11/438,525 filed May 22, 2006 now U.S. Pat. No. 7,507,432 which is a continuation-in-part of U.S. application Ser. No. 11/071,077 filed Mar. 3, 2005, the disclosures of which are incorporated by reference.

TECHNICAL FIELD

This invention relates to a food product, and more particularly to a non-dairy food product.

BACKGROUND

Many adults suffer from lactose intolerance, which is defined as the inability to break down lactose, the main sugar found in dairy products, as a result of the lack of a specific digestive enzyme known as lactase. To manage this condition, many people seek non dairy-based foods that possess similar satisfying tastes and consistencies as traditional dairy-based foods. In addition to dairy, food products containing soy are well known, and many foods incorporate soy as an alternative to dairy. A food product which is also essentially free of soy would be a useful alternative for individuals wishing to avoid soy-based foods.

In addition, many people closely regulate the amount and type of sugar and other sweeteners in their diet. There is a continuing need to find new food products, suitable to provide healthy and satisfying alternatives for people who have strict dietary requirements related to intake of dairy and/or sweeteners.

SUMMARY

According to one embodiment, there is provided a food composition comprising a liquefying agent, a nut-seed component, salt, baking soda, and optionally, a starch, wherein:
  the liquefying agent is present in an amount from about 43% to about 92% by weight;
  the nut-seed component is present in an amount from about 7% to about 55% by weight; the starch is optionally present in an amount from about 0.04% to about 6% by weight;
  salt is present in an amount from about 0.000075% to about 0.1% by weight; and
  baking soda is present in an amount from about 0.000075% to about 0.1% by weight;
  wherein the liquefying agent and the nut-seed component are suitably combined to form a cream.

According to a sub-embodiment thereof the liquefying agent is present in an amount from about 72% to about 92% by weight and the nut-seed component is present in an amount from about 7% to about 32% by weight;

According to another embodiment, there is provided a method for preparing the food composition described above (in the previous two paragraphs); the process comprising
  (a) grinding the nut-seed component and adding the liquefying agent to form a cream; and
  (b) adding to the cream formed in step (a) the salt and baking soda, and optionally, the starch, to form the food composition.

According to another embodiment, there is provided a food composition comprising water, almonds, cashews, salt, baking soda, and optionally a starch, comprising:
  from about 60 to about 76% by weight of a liquefying agent;
  from about 11 to about 19% by weight almonds;
  from about 12 to about 20% by weight cashews;
  wherein the liquefying agent, the almonds and the cashews are suitably combined to form a cream;
  about 0.1% by weight salt;
  about 0.1% by weight baking soda; and optionally;
  from about 1.4 to about 1.6% by weight starch;
  wherein the cream, the salt, the baking soda, and optionally the starch are suitably combined to form a base.

According to a sub-embodiment, the liquefying agent is water.

According to another embodiment, there is provided a food composition comprising a liquefying agent, a nut-seed component, salt, at least one sweetening agent, and optionally a baking soda and a starch, wherein:
  the liquefying agent is present in an amount from about 33% to about 84% by weight;
  the nut-seed component is present in an amount from about 4% to about 47% by weight;
  salt is present in an amount from about 0.000075% to about 0.1% by weight;
  the sweetening agent is present in an amount from about 6% to about 48% by weight;
  baking soda is optionally present in an amount from about 0.000075% to about 0.1% by weight; and
  the starch is optionally present in an amount from about 0.01% to about 5% by weight;
  wherein the liquefying agent and the nut-seed component are suitably combined to form a cream.

According to a sub-embodiment thereof the liquefying agent is present in an amount from about 68% to about 84% by weight, the nut-seed component is present in an amount from about 4% to about 31% by weight, and the sweetening agent is present in an amount from about 6% to about 19% by weight.

According to another embodiment, there is provided a method for preparing the food compositions described above (in the previous two paragraphs) containing a sweetener; the process comprising:
  (a) grinding the nut-seed component and adding the liquefying agent to form a cream; and
  (b) adding to the cream formed in step (a) the salt, the sweetening agent, and optionally the baking soda and the starch, to form the food composition.

According to a sub-embodiment of the methods and compositions above, the liquefying agent is water. The liquefying agent that is added may be, for example, nearly-boiling water.

According to some embodiments, the nut-seed component used in the methods and compositions above comprises at least one of almonds and cashews. According to another embodiment, the nut-seed component comprises almonds and cashews. According to a sub-embodiment, the almonds and cashews may be a mixture of almonds and cashews combined in about a 1:1 ratio, by weight.

The compositions may be frozen. The cream formed from the nut-seed component and the liquefying agent may be strained to remove particulate matter if such particulate matter remains in the formed cream.

The sweetening agent used in the methods and compositions of the invention includes, but is not limited to, sugar and sugar substitutes.

In another embodiment, a food composition is provided that comprises from about 23% to about 42% by weight of at least one of the group consisting of almonds and cashews, from about 27% to about 65% by weight of a liquefying agent capable of forming a cream when combined with the almonds and/or cashews, from about 10% to about 19% by weight of at least one sweetening agent, and from about 0.0003% to about 0.0006% by weight of salt. The almonds and/or cashews may be a combination of almonds and cashews in a 1:1 ratio by weight. The liquefying agent may be, for example, water. The sweetening agent may be selected, for example, from the group consisting of sugar, xylitol crystals and erythritol.

In another embodiment, a food composition is provided that comprises about 42% by weight of at least one of the group consisting of almonds and cashews, about 47% by weight of a liquefying agent capable of forming a cream when combined with the almonds and/or cashews, about 10.5% by weight of at least one sweetening agent, and about 0.00054% by weight of salt. The almonds and/or cashews may be a combination of almonds and cashews in a 1:1 ratio by weight. The liquefying agent may be, for example, water. The sweetening agent may be selected, for example, from the group consisting of sugar, xylitol crystals and erythritol.

In another embodiment, a frozen, non-dairy, non-soy based dessert composition is provided, that comprises about 42% by weight of almonds and cashews wherein the almonds and cashews have been finely ground, about 47% by weight of water, capable of forming a cream when combined with the almonds and cashews, about 10.5% by weight of at least one sweetening agent, and about 0.00054% by weight of salt. The almonds and cashews may be combined, for example, in a 1:1 ratio. The sweetening agent may be selected, for example, from the group consisting of sugar, xylitol crystals and erythritol.

In yet another embodiment, a method for producing a food composition is provided, the method comprising grinding from about 23% to about 42% by weight of at least one of the group consisting of almonds and cashews, and adding from about 27% to about 65% by weight of a liquefying agent to form a cream. To this cream is added from about 10% to about 19% by weight of at least one sweetening agent, and from about 0.0003% to about 0.0006% by weight of salt to form a mixture. The mixture may be frozen. The cream may be strained to remove particulate matter. The almonds and/or cashews that are ground may be a mixture of almonds and cashews combined, for example, in a 1:1 ratio. The liquefying agent that is added may be, for example, nearly-boiling water. The sweetening agent that is added may be selected, for example, from the group consisting of sugar, xylitol crystals and erythritol.

In still another embodiment, a method for producing a food composition is provided, comprising grinding about 42% by weight of at least one of the group consisting of almonds and cashews and adding about 47% by weight of a liquefying agent to form a cream. To this cream is added about 10.5% by weight of at least one sweetening agent, and about 0.00054% by weight of salt to form a mixture. The mixture may be frozen. The cream may be strained to remove particulate matter. The almonds and/or cashews that are ground may be a mixture of almonds and cashews combined, for example, in a 1:1 ratio. The liquefying agent that is added may be, for example, nearly-boiling water. The sweetening agent that is added may be selected, for example, from the group consisting of sugar, xylitol crystals and erythritol.

In yet another embodiment a method for making a frozen, non-dairy, non-soy based dessert composition is provided, comprising grinding about 42% by weight of almonds and cashews and adding about 47% by weight of nearly-boiling water to form a cream. To this cream is added about 10.5% by weight of at least one sweetening agent, and about 0.00054% by weight of salt to form a mixture. The mixture may be frozen. The cream may be strained to remove particulate matter. The almonds and/or cashews that are ground may be a mixture of almonds and cashews combined, for example, in a 1:1 ratio. The liquefying agent that is added may be, for example, nearly-boiling water. The sweetening agent that is added may be selected, for example, from the group consisting of sugar, xylitol crystals and erythritol.

The details of one or more embodiments of the invention are set forth in the accompanying description below. Other features, objects, and advantages of the invention will be apparent from the description, and from the claims.

DETAILED DESCRIPTION

In general terms, the food compositions or products described herein make use of a nut-seed component, e.g., almonds, cashews, or both, that is finely ground and suitably combined with a liquefying agent, e.g., water, salt and either:
(a) baking soda and, optionally, a starch; or
(b) at least one sweetening agent, optionally baking soda and optionally a starch;
to form a food composition that is a creamy base.

In one embodiment, the food composition is substantially free of particles of the almonds or cashews, giving it a "mouthfeel" which approximates dairy- or soy-based products. The term "mouthfeel," as used herein refers to how food or drink feels in one's mouth, and to the sensory evaluation of tactile impressions on the palate. Additional flavorings of any variety can be added to the base to form any corresponding flavored food composition.

Some embodiments of the food composition may be frozen. According to some embodiments, the food composition forms a frozen dessert composition, simulating ice-cream, frozen yogurt, custard, or other dairy-based frozen and semi-frozen desserts, as well as soy-based alternatives to any of these.

According to some embodiments, the food composition contains substantially no dairy or other lactose-containing components. According to some embodiments, the food composition contains substantially no soy or soy-based components. According to some embodiments, the almonds, cashews or mixture of almonds and cashews together substitute substantially for both dairy and soy components, making a composition which is both substantially dairy- and lactose-free on the one hand, and also soy-free on the other hand.

As such, certain embodiments of the food composition can be formulated to be useful in the creation of a number of desirable food products, including, but not limited to, foods having a taste and consistency comparable to heavy cream, light cream, half-and-half, whole milk, evaporated milk, condensed milk, ice cream, frozen yogurt, and the like.

The cashew, botanically-known as *Anacardium occidentale*, is the seed of a tropical evergreen plant related to the mango, pistachio, and poison ivy. The almond is the ellipsoidal kernel of a tree (*Prunus dulcis*) which belongs to the same group of plants as the rose, plum, cherry and peach, and can be either eaten as a nut or used for extraction of an oil for flavoring. In one embodiment, both almonds and cashews are used to form the base. It has been found that both almonds and cashews together provide a sufficiently neutral-tasting base to which various flavorings can be added. This aspect is especially useful, since, for example, when sweeteners and additional flavorings are added, a wide variety of food products having a corresponding variety of flavors is created.

The nut-seed component for compositions that do not contain a sweetening agent may be present at a lower limit of, for example, about 7%, or about 24%, or about 32%, or about 37%, or about 38% by weight, and may be present at an upper limit of, for example, about 32%, or about 38%, or about 46% or about 55% by weight. For example the nut-seed component for compositions that do not contain a sweetening agent may be from about 7% to about 55% by weight, or from about 24% to about 46% by weight, or from about 24% to about 38% by weight, or from about 24% to about 32% by weight, or from about 32% to about 38% by weight, or from about 37% to about 46% by weight, or from about 37% to about 38% by weight. According to some embodiments of compositions that do not contain a sweetening agent, the nut-seed component is present in an amount from about 7% to about 32% by weight.

The nut-seed component for compositions that contain a sweetening agent may be present at a lower limit of, for example, about 4%, or about 16% or about 23%, or about 27% by weight, and may be present at an upper limit of, for example, about 31%, or about 39% or about 42%, or about 47% by weight. For example, the nut-seed component for compositions that contain a sweetening agent can be from about 4% to about 47% by weight, or from about 23% to about 42% by weight, or from about 16% to about 39% by weight, or from about 27% to about 39% by weight, or from about 27% to about 31% by weight. According to some embodiments of compositions that contain a sweetening agent, the nut-seed component is present in an amount from about 4% to about 31% by weight.

The nut-seed component comprises at least one nut or seed. According to some embodiments, the nut-seed component includes, but is not limited to, almonds and cashews. For example, other materials that may be incorporated in addition to almonds and cashews include, without limitation, macadamia nuts, sunflower seeds, pecans, Brazil nuts, pine nuts, butternuts, walnuts, beechnut, hickory nuts, chestnuts, sesame seeds and sunflower seeds. Alternatively, in some embodiments, the nut-seed component may include neither almonds nor cashews.

According to some embodiments, the nut-seed component comprises nuts and/or seeds that may be whole pieces, chopped pieces, ground pieces, or any mixture thereof. Grinding of nuts and/or seeds may reduce the particle size to a degree that the nut/seed becomes a homogenous plastic or semiplastic mass, or a liquid. Such a form of a finely ground nut or seed is generally referred to as a "butter." Thus, according to some embodiments, the nut-seed component comprises a nut butter and/or a seed butter.

The term "butter" as it is used herein, is known in the art. The term "nut butter" generally refers to nuts that have been ground into a homogenous plastic or semiplastic mass, or liquid. In some embodiments, the homogenous plastic or semiplastic mass may have few particles greater than about $1/16$ inch in any dimension.

According to some embodiments, the almonds are organic almonds. According to some embodiments, the almonds used as a starting material for the processes are blanched almonds. According to some embodiments, the almonds used as a starting material for the processes are one or more of whole almonds, pieces of almonds or chopped almonds or an almond meal. According to other embodiments, the almonds used as a starting material for the processes comprise an almond butter, such as, without limitation, a blanched almond butter.

According to some embodiments, the cashews used as a starting material for the processes are raw cashews. According to some embodiments, the cashews used as a starting material for the processes are organic cashews. According to some embodiments, the cashews used as a starting material for the processes are one or more of whole cashews, cashew pieces or chopped cashews or a cashew meal. According to other embodiments, the cashews used as a starting material for the processes comprise a cashew butter, including, but not limited to, a raw cashew butter.

As used herein, the terms "blanched," "raw," and "organic" correspond to definitions familiar to those skilled in the relevant art. The terms "almond butter" and "cashew butter" are known in the art. In particular, "almond butter: is defined in the Code of Federal Regulations (CFR).

Almond butter as used in §981.66(c) is hereby defined as a comminuted food product prepared by grinding shelled or blanched almonds into a homogeneous plastic or semiplastic mass or liquid having very few particles larger than $1/16$ inch in any dimension. To produce chunky style almond butter, almond chunks or pieces may be added up to a maximum of 25 percent by weight of the finished product. The size of the almond pieces used to make chunky style almond butter may not exceed $5/16$ inch in any dimension. 7 CFR 981.466 (Jan. 1, 2005).

According to some embodiments, the nut-seed component comprises almonds and cashews in a ratio of about 1 to 1 by weight. According to some embodiments, the nut-seed component comprises almonds and cashews in a ratio of about 2 to 1 (almonds to cashews) by weight.

According to some embodiments, the nut-seed component comprises an almond butter or a cashew butter. According to some embodiments, the nut-seed component comprises both an almond butter and a cashew butter. In other embodiments, the nut-seed component comprises an almond butter and/or a cashew butter combined with at least one additional nut or seed.

One preferred embodiment makes use of substantially equal parts of liquefied almonds ("almond cream") and liquefied cashews ("cashew cream") to form the base. In those embodiments where the nut-seed component is used to substantially replace dairy- or soy-based components in the base, the resulting food composition is a viable alternative for those who are lactose intolerant, or who wish to avoid products containing soy.

The liquefying agent contributes to smoothness and consistency, as varying the amount of added liquid can influence the viscosity of the final food product.

The liquefying agent, for compositions that do not contain a sweetening agent may be present at a lower limit of, for example, about 43%, or about 54% or about 60%, or about 67%, or about 72% by weight, and may be present at an upper limit of, for example, about 61%, or about 67%, or about 75% or about 92% by weight. For example, the liquefying agent, for compositions that do not contain a sweetening agent, can be from about 43% to about 92% by weight, or from about 54% to about 75% by weight, or from about 54% to about 61% by weight, or from about 60% to about 61% by weight, or from about 60 to about 75% by weight, or from about 60 to about 67% by weight, or from about 67 to about 75% by weight. According to some embodiments of compositions that do not contain a sweetening agent, the liquefying agent is present in an amount from about 72% to about 92% by weight.

The liquefying agent, for compositions that contain a sweetening agent may be present at a lower limit of, for example, about 27%, or about 33% or about 36%, or about 41%, or about 43%, or about 61%, or about 68% by weight, and may be present at an upper limit of, for example, about 48%, or about 57% or about 65%, or about 68%, or about 76%, or about 84% by weight. For example, the liquefying agent, for compositions that contain a sweetening agent, can be from about 33% to about 84% by weight, or from about 27% to about 65% by weight, or from about 41% to about 57% by weight, or from about 43% to about 57% by weight, or from about 36% to about 48% by weight, or from about 61% to about 76% by weight, or from about 61% to about 68% by weight, or from about 68% to about 76% by weight. According to some embodiments of compositions that contain a sweetening agent, the liquefying agent is present in an amount from about 68% to about 84% by weight.

Any of a wide variety of liquefying agents may be used. Some examples, without limitation, may include pure filtered water, purified reverse-osmosis treated water, distilled water and tap water, milk, or milk substitutes.

In some embodiments using water as the liquefying agent, the water is heated to a temperature from about 175 and about 190 degrees Fahrenheit (from about 79° C. to about 88° C.), that is, "nearly boiling," and such nearly boiling water is combined with the almonds and or the cashews. In other embodiments the water is used at an elevated temperature, for example from about to about 45° C. to about 60° C. According to still other embodiments, the water is used at ambient temperature, i.e., from about 20° C. to about 30° C.

The salt used in the composition also contributes to flavoring characteristics. The salt, for both compositions that contain a sweetening agent, and for compositions that do not contain a sweetening agent can be, for example from about 0.000075% to about 0.003% by weight, or from about 0.0003% to about 0.0006% by weight, or from about 0.00086% to about 0.00094% by weight. According to some embodiments, salt is present in an amount from about 0.05% to about 0.11% by weight. Any of a wide variety of types of salt, e.g., for example, sea salt, Kosher salt, table salt, may be used.

Starch is optionally added to the compositions. According to one embodiment, the starch is selected from at least one of waxy rice starch, corn starch and tapioca starch. According to another embodiment, the starch is selected from at least one of waxy rice starch and tapioca starch.

For compositions that do not contain a sweetening agent, the starch may be present at a lower limit of, for example, about 0.04%, or about 0.66%, or about 0.9%, or about 1.4% by weight, and may be present at an upper limit of, for example, about 0.73, or about 1.0%, or about 1.6%, or about 1.9%, or about 2.4%, or about 6.0% by weight. For example, the starch component for compositions that do not contain a sweetening agent may be, without limitation, from about 0.04% to about 6% by weight, or from about 0.66% to about 0.73%, or from about 0.9% to about 2.4% by weight, or from about 0.9% to about 1.9% by weight, or from about 0.9% to about 1.0% by weight, or from about 1.4% to about 1.6% by weight. According to some embodiments of compositions that do not contain a sweetening agent, starch is present in an amount from about 0.04% to about 0.73% by weight.

The starch component for compositions that contain a sweetening agent can be, for example, from about 0% up to an upper level that is from about 1.4% to about 5% by weight, for example, from about 0.01% to about 5% by weight, or from about 0.04% to about 2% by weight, or from about 0.9% to about 1.9% by weight, or from about 0.9% to about 1.4% by weight. According to some embodiments of compositions that contain a sweetening agent, starch is present in an amount from 0.01% to about 1.4% by weight.

Baking soda is optionally added to the compositions. "baking soda," as used herein means sodium bicarbonate.

The baking soda component for compositions that do not contain a sweetening agent can be, for example from about 0.000075% to about 0.1% by weight, or from about 0.09 to about 0.1% by weight, or from about 0.003% to about 0.006% by weight.

The baking soda component for compositions that contain a sweetening agent can be, for example, from about 0% up to an upper level that is from about 0.000075% to about 0.1% by weight, for example from about 0.09% to about 0.1% by weight, or from about 0.003% to about 0.006% by weight.

Some embodiments further comprise at least one sweetening agent. The sweetening agent can impart a degree of satisfying flavor to certain of the compositions.

For compositions containing at least one sweetening agent, the sweetening agent may be present at a lower limit of, for example, about 6%, or about 10% or about 11%, or about 23% by weight, and may be present at an upper limit of, for example, about 19%, or about 34% or about 38%, or about 48% by weight. For example, for compositions containing a sweetening agent, the sweetening agent may be present in an amount from about 6% to about 48% by weight; or from about 11% to about 38% by weight; or from about 23% to about 38% by weight; or from about 23% to about 34% by weight; or from about 10% to about 19% by weight. According to some embodiments of compositions that contain a sweetening agent, the sweetening agent is present in an amount from about 6% to about 19% by weight.

Suitable sweetening agents include, but are not limited to, sugar (sucrose) and sugar substitutes. The term "sugar" is commonly used, as in the previous sentence to refer to the particular sweetener, sucrose. However, the term "sugar" is also used more broadly to refer to a chemical class of water-soluble crystalline carbohydrates such as sucrose, lactose, fructose, maltose, glucose and galactose. Any of a wide variety of sugars may be used. Some examples of sugars include, without limitation, beet sugar, pure cane sugar, evaporated cane sugar, evaporated cane juice, refined sugar, organic evaporated cane sugar, organic evaporated cane sugar, rice bran syrup, tapioca syrup, fructose, fructose syrup, crystallized fructose, and the like.

Sugar substitutes include, without limitation, sucralose (SPLENDA™), aspartame, saccharine, and acesulfame potassium, brazzein, curculin, mabinlin, erythritol, fructose, glycyrrhizin, glycerol, hydrogenated starch hydrolysates, isomalt, monellin, pentadin, stevia, tagatose, thaumatin, alitame, cyclamate, dulcin, neohesperidine dihydrochalcone, neotame, and sugar alcohols such as sorbitol, maltitol, lactitol, mannitol, erythritol and xylitol, e.g., xylitol crystals. According to an embodiment the sweetening agent may be selected from at least one of sugar, xylitol crystals and erythritol. According to another embodiment the sweetening agent may be selected from at least one of sugar and xylitol crystals.

Sweetening agents vary widely with respect to the degree of sweetness of the agent. Other sweetening agents may be less sweet or sweeter than sucrose. The following Table shows the relative sweetness of several known sweetening agents based on sucrose as a standard, e.g., for example, sucralose, has a sweetness factor of 600× and accordingly is deemed to be 600 times as sweet as sucrose on a wt./wt. basis.

| Name of sweetening agent/sugar substitute | Sweetness factor compared to sucrose | Name of sweetening agent/sugar substitute | Sweetness factor compared to sucrose |
|---|---|---|---|
| Brazzein | 2,000× | Pentadin | 500× |
| Curculin | 550× | Stevia | 250× |
| Mabinlin | 100× | Tagatose | 0.92× |
| Erythritol | 0.7× | Thaumatin | 2,000× |
| Fructose | | Xylitol | 1.0× |
| Glycyrrhizin | 50× | Acesulfame potassium | 200× |
| Glycerol | 0.6× | Alitame | 2,000× |
| Hydrogenated starch hydrolysates | 0.4×-0.9× | Aspartame | 160-200× |
| Isomalt | 0.45×-0.65× | Cyclamate | 30× |
| Lactitol | 0.4× | Dulcin | 250× |
| Maltitol | 0.9× | Neohesperidine dihydrochalcone | 1,500× |
| Mannitol | 0.5× | Neotame | 8,000× |
| Erythritol | 0.7× | Saccharin | 300× |
| Monellin | 3,000× | Sucralose | 600× |

Because of the significant differences in sweetness of different sweetening agents, the weight percent of the sweetening agent, for compositions and methods herein that employ a sweetening agent, is based on the sweetness of sucrose. Thus, a composition containing, for example 20% by weight of a sweetening agent embraces a composition containing 20% by weight of sucrose, and also embraces, for example, a composition containing 10% by weight of a sweetening agent that is two times the sweetness of sucrose, and 0.033% by weight of a sweetening agent that is 600 times as sweet as sucrose. Mixtures of sweetening agents may be employed. For example, a small amount of an intensely sweet sugar substitute, e.g., sucralose, may be mixed with sucrose to tune the physical and sensory characteristics of the sweetening agent.

According to one embodiment, there is provided a composition comprising about 60.4% by weight water, about 18.6% by weight almonds, about 19.3% by weight cashews, about 1.5% by weight starch, about 0.1% by weight salt, and about 0.1% by weight baking soda.

According to another embodiment, there is provided a composition comprising about 66.7% by weight water, about 15.6% by weight almonds, about 15.9% by weight cashews, about 1.6% by weight starch, about 0.1% by weight salt, and about 0.1% by weight baking soda.

According to another embodiment, there is provided a composition comprising about 74.8% by weight water, about 11.6% by weight almonds, about 12.0% by weight cashews, about 1.4% by weight starch, about 0.1% by weight salt, and about 0.1% by weight baking soda.

According to another embodiment, there is provided a composition comprising about 61.3% by weight water, about 18.8% by weight almonds, about 19.6% by weight cashews, about 0.09% by weight salt, and about 0.09% by weight baking soda.

According to another embodiment, there is provided a composition comprising about 67.8% by weight water, about 15.8% by weight almonds, about 16.2% by weight cashews, about 0.1% by weight salt, and about 0.1% by weight baking soda.

According to another embodiment, there is provided a composition comprising about 75.9% by weight water, about 11.7% by weight almonds, about 12.2% by weight cashews, about 0.1% by weight salt, and about 0.1% by weight baking soda.

According to an embodiment, an unsweetened composition comprises about 85.09% by weight water, about 7.26% by weight almonds, about 7.26% by weight cashews, about 0.09% by weight baking soda, about 0.055% by weight salt and about 0.1% by weight starch.

According to an embodiment, a sweetened composition comprises about 76.9% by weight water, about 6.57% by weight almonds, about 6.57% by weight cashews, about 0.08% by weight baking soda, about 0.05% by weight salt, about 0.17% by weight starch and about 9.52% by weight sugar (sucrose).

According to an embodiment, an artificially sweetened composition comprises about 78.02% by weight water, about 6.66% by weight almonds, about 6.66% by weight cashews, about 0.085% by weight baking soda, about 0.05% by weight salt, about 0.18% by weight starch and about 8.22% by weight erythritol.

According to some embodiments, a flavoring agent is added to the composition. Addition of a flavoring agent is done generally in those applications where it is desired for the food composition to assume any of a variety of corresponding flavors. The amount of flavoring agent added can be between about 0.00032% and about 0.0019% by weight, which amount varies according to the type of flavoring agent used.

Appealing, popular flavors suitable for the food composition, include, but are not limited to, vanilla extract, vanilla bean, chocolate, raw ground fresh fruit, hazelnut, mint extracts (peppermint, spearmint, wintergreen), lemon juice, lemon rind, orange juice, orange rind and shredded unsweetened coconut. Some examples of types of chocolate which can be used, without limitation, may include chocolate, cocoa, unsweetened chocolate, semi-sweet chocolate, bittersweet chocolate, cocoa mast, cocoa nibs, and unsweetened cocoa. Some examples of raw ground fresh fruit which can be used, without limitation, may include strawberries, peaches, raspberries, blueberries, blackberries, cloudberries, bananas, papayas, mangoes, nectarines and cherries.

When the nut-seed component is in the form of a particulate material, including, but not limited to, whole nuts/seeds, pieces of nuts/seeds, or chopped nuts/seeds, the food composition may be made by first grinding the nut-seed component to a suitably fine size. The ground nuts/seeds may comprise a finely ground meal, a nut and/or seed butter, or the like.

Alternatively, the food composition may be made by using a nut-seed component that comprises a nut/seed butter, e.g., comprising nuts and/or seeds that have previously been processed to form a nut and/or seed butter. When the nut-seed component employed in the process is a nut and/or seed butter, the step of grinding is unnecessary and the nut-seed component, in the form of a nut and/or seed butter is mixed with a liquefying agent to form a cream.

In some embodiments, the food composition is made by first grinding the almonds or cashews (separately or together) to a suitably fine size. The almonds or cashews, that are ground to a suitably fine size may be in the form of an almond butter and/or cashew butter. Alternatively, the food composition may be made by starting with an almond butter and/or a cashew butter rather than by starting with almonds and/or cashews that need to be ground to decrease their particle size.

According to some embodiments, the liquefying agent, including, but not limited to, water, is added to the nut-seed component, for example, almonds or cashews, at any point before, during, or after grinding so as to "liquefy" the almonds and/or cashews sufficiently to form corresponding "cream." According to some embodiments, the liquefying agent is added to a nut-seed component that comprises a seed and/or nut butter. According to some embodiments the nut-seed component is liquefied to form a corresponding cream without the addition of any liquefying agent.

According to some embodiments, the grinding produces a cream that does not contain particulate matter sufficient to be discernible by "mouthfeel." Such grinding may be accomplished by some commercial grade grinding machines such as, for example a Ross Mixers, model # HSM-100LCI, having attachments HSM and HSD, manufactured by Ross Mixers, 1249 SE Industrial Blvd. Port St. Lucie, Fla. According to other embodiments, the cream formed by grinding may contain particulate matter that may be discernible by "mouthfeel." According to some embodiments, the cream is strained to remove particulate matter which otherwise would be discernible by "mouthfeel," so as to yield a smooth consistency to the almond cream and/or cashew cream.

According to one embodiment, a base is formed by intermixing the almond cream and the cashew cream, if they are not already in such state, by intermixing during the grinding step. The cream is mixed with at least one sweetening agent (for compositions that contain a sweetening agent) and salt. Baking soda and a starch are optionally added to the compositions. Various flavoring agents can optionally then be added to the base, and the base may optionally be further processed, e.g., by freezing or refrigeration.

The food composition may be processed as a product that mimics the texture, flavor and consistency of traditional, dairy-based heavy cream, light cream, half-and-half, whole milk, and the like. The food composition, particularly the food composition containing a sweetening agent, may be processed in frozen form as a product that mimics the texture, flavor and consistency of traditional, dairy-based ice cream, frozen yogurt, sorbet, custard, soy-based or other types of ice-cream substitutes, and the like.

According to some embodiments, the food composition is further processed by homogenization and elimination of potential pathogens by a treatment such as pasteurization or sterilization. Though pasteurization conditions effectively eliminate pathogenic microorganisms, it may not be sufficient to inactivate the thermoresistant spores in a food product. The term "sterilization" refers to the complete elimination of all microorganisms. One sterilization process, termed "ultra-high temperature" (UHT) processing, employs temperatures exceeding 135° C., which permits a decrease in the necessary holding time (to about 2-5 seconds) of the composition at high temperature thereby enabling a continuous flow operation. The UHT process generally comprises the sterilization of a food composition before packaging, and then transferring of the sterilized product into pre-sterilized containers, all performed in a sterile atmosphere.

The amounts of components employed in the compositions and methods described herein are generally reported on a weight percent basis (wt. %), i.e., the amount of the component is listed as the mass of the component divided by the mass of the total composition and expressed as a percentage. The disclosed amounts of components and ranges of amounts of components are understood to be approximate.

EXAMPLES

The following non-limiting examples further illustrate different embodiments of the food composition. All weights and volumes provided in the examples are approximate. Also volumes provided in the examples for ground materials, creams and particulate materials removed by filtration are understood to be variable due to the variability in the density of such materials.

Example 1

| Ingredient | Amount |
| --- | --- |
| Raw cashews, organic preferred | 2 Cups |
| Blanched almonds, organic preferred | 2 Cups |
| Pure filtered water | 4 Cups |
| Kosher salt | 1/8 tsp |
| Pure evaporated cane sugar, organic preferred or xylitol crystals | 1/2 to 3/4 Cup |

Two cups of raw organic cashews are finely ground in a food processor or juicer. The finely ground cashews are placed in a kitchen blender (such as Waring or Osterizer), and two cups of nearly boiling pure filtered water are added. The mixture is blended on high power for approximately one minute, or until a thick cream is produced, yielding approximately 4 cups of cream.

The cream is strained through two layers of fine "jelly bag" cloth to filter out particulate matter otherwise detectable by mouthfeel until only a smooth cream remains. Total yield is approximately 4 cups of cashew cream.

The above mixing and straining procedure is repeated using blanched almonds, to yield approximately 4 cups of almond cream.

One cup of cashew cream and one cup of almond cream are combined with 1/8 tsp kosher salt and approximately 1/2 to 3/4 cup pure evaporated cane sugar to create the "ice cream" base from which other compositions may be prepared.

To this base may be added various flavoring agents; various non-limiting examples include vanilla extract, pure cocoa/chocolate and raw ground fresh fruit, including strawberries and peaches, and shredded, unsweetened coconut.

Example 2

| Ingredient | Amount |
| --- | --- |
| Raw cashews, organic preferred | 4 Cups |
| Blanched almonds, organic preferred | 4 Cups |
| Purified (preferably reverse osmosis) water, heated to 175-190 degrees Fahrenheit | 12 Cups |
| Kosher salt | 1/8 tsp |
| Pure evaporated cane sugar, organic preferred or xylitol crystals | 1/2-3/4 Cup |

Four cups whole blanched almonds are placed in the hopper/container of a Vita-Mix Whole Food Machine (Variable Speed model, manufactured by Vita-Mix Corporation, 8615 Usher Road, Cleveland, Ohio 44138), or any commercial or household blender that has a very high power blending capacity. Four cups of purified (preferably reverse-osmosis) water are added, and the mixture is pureed on Low Variable (I) power, setting #4 for 30 seconds. The setting is increased to #10, and the mixture is further blended for one minute. Two cups of the almond puree is removed and reserved in a separate container.

To the remaining two cups of almond puree remaining in the blender, two additional cups of purified water are added.

The mixture is liquefied on High (II) Power, setting #0 for one minute. The resulting liquefied almond cream is poured into a storage container.

The reserved two cups of almond puree is retrieved and poured into the container of the Vita-Mix Blender. To this puree is added two cups of purified water, and the mixture is liquefied on High (II) Power, setting #0 for one minute. The resulting liquefied almond cream is poured into the same storage container holding the previously made liquefied almond cream and refrigerated. Total yield is 12 cups almond cream.

Four cups of whole raw cashews are placed in the hopper/container of a Vita-Mix Whole Food Machine (Variable Speed model, manufactured by Vita-Mix Corporation, 8615 Usher Road, Cleveland, Ohio 44138), or any commercial or household blender that has a very high power blending capacity. Four cups of purified (preferably reverse-osmosis) water are added, and the mixture is pureed on Low Variable (I) power, setting #4 for 30 seconds. The setting is increased to #10, and the mixture is further blended 30 seconds. The variable speed is dialed down to #0 and increased to High (II) Power, and the contents are liquefied for an additional one minute. The liquefied cashew cream is poured into a storage container and refrigerated. Total yield is 8 cups of cashew cream.

One cup of cashew cream and one cup of almond cream are combined with ⅛ tsp kosher salt and approximately ½ to ¾ cup pure evaporated cane sugar to create the "ice cream" base from which all compositions proceed.

To this base may be added various flavoring agents; various non-limiting examples include vanilla extract, pure cocoa/chocolate and raw ground fresh fruit, including strawberries and peaches, and shredded, unsweetened coconut.

Example 3

| Ingredient | Amount |
| --- | --- |
| Raw Cashews | 4 Cups |
| Raw Almonds | 4 Cups |
| Pure Filtered Water | 18.66 Cups |
| Waxy Rice Starch | 2.24 oz. |
| Salt, Kosher or Table salt | 1 teaspoon |
| Baking Soda | 1 teaspoon |

Two cups of almonds are placed in the hopper of a Vita-Mix Whole Food Machine. Four cups of purified water are added to the almonds in the hopper, and the resulting mixture is pureed on Low Variable (I) Power, setting #4 for about 30 seconds. The machine setting is increased to #10, and the mixture is further blended for about one minute. The variable speed is dialed down to #0 and increased to High (II) Power, and the contents are further liquefied for about one minute. The resulting liquefied almond cream is poured into a storage container and set aside. Another two cups of almonds are placed in the hopper of the Vita-Mix Whole Food Machine. Six and two-thirds (6.66) cups of purified water are added to the almonds in the hopper, and the resulting mixture is pureed on Low Variable (I) Power, setting #4 for about 30 seconds. The machine setting is increased to #10 setting, and the mixture is further blended for about one minute. The variable speed is dialed down to #0 and increased to High (II) Power, and the contents are further liquefied for about one minute. The resulting liquefied almond cream is poured into the container with the previously prepared almond cream. The yield is approximately 12 cups almond cream. This 12 cups of cream is then strained through a micro-mesh screen or filter cloth such as Filter fabric FF-4003 (Filter Fabrics Inc. of 814 E. Jefferson St., Goshen Ind. 46528) and the fine particulate almond mast (approx. 4 cups) is thereby removed. The yield of almond cream, after straining is approximately 8 cups.

Four cups of whole raw cashews are placed in the hopper of a Vita-Mix Whole Food Machine. Four cups of purified water is added, and the resulting mixture is pureed on Low Variable (I) power, setting #4 for about 30 seconds. The machine setting is increased to #10, and the mixture is further blended for about 30 seconds. The variable speed is dialed down to #0, and one teaspoon of salt (Table or Kosher); one teaspoon of baking soda and 2.24 oz. of waxy rice starch are added to the hopper. The machine is switched to High (II) Power, and the contents are liquefied for about one minute. The liquefied cashew cream is poured into a storage container and refrigerated. The yield is about 8 cups of cashew cream.

The thus prepared cashew cream and almond cream are combined in a container, covered and shaken thoroughly.

Example 4

| Ingredient | Amount |
| --- | --- |
| Raw Cashews | 2 Cups |
| Raw Almonds | 2 Cups |
| Pure Filtered Water | 16 Cups |
| Waxy Rice Starch | 2.24 oz. |
| Salt, Kosher or Table salt | 1 teaspoon |
| Baking Soda | 1 teaspoon |

Two cups of almonds are placed in the hopper of a Vita-Mix Whole Food Machine. Eight cups of purified water are added to the almonds in the hopper, and the resulting mixture is pureed on Low Variable (I) Power, setting #4 for about 30 seconds. The machine setting is increased to #10, and the mixture is further blended for about one minute. The variable speed is dialed down to #0 and increased to High (II) Power, and the contents are further liquefied for about one minute. The resulting liquefied almond cream is poured into a storage container and set aside. The yield is about 9 cups of almond cream. This 9 cups of cream is then strained through a micro-mesh screen or filter cloth such as Filter fabric FF-4003 and the fine particulate material, termed almond mast (about 2 cups) is thereby removed. The yield of almond cream, after straining is about 7 cups.

Two cups of whole raw cashews are placed in the hopper of a Vita-Mix Whole Food Machine. Eight cups of purified water is added, and the resulting mixture is pureed on Low Variable (I) power, setting #4 for about 30 seconds. The machine setting is increased to #10, and the mixture is further blended for about 30 seconds. The variable speed is dialed down to #0, and one teaspoon of salt (Table or Kosher); one teaspoon of baking soda and 2.24 oz. of waxy rice starch are added to the hopper. The machine is switched to High (II) Power, and the contents are liquefied for about one minute. The liquefied cashew cream is poured into a storage container and refrigerated. The yield is about 8 cups of cashew cream.

The thus prepared cashew cream and almond cream are combined in a container, covered and shaken thoroughly.

Example 5

| Ingredient | Amount |
| --- | --- |
| Raw Cashews | ½ Cup |
| Raw Almonds | ½ Cup |
| Purified Water | 1 Cup |
| Waxy Rice Starch | .28 oz. |
| Salt, Kosher or table Salt | ⅛ teaspoon |
| Baking Soda | ⅛ teaspoon |

Almonds (0.5 cup) are placed in the hopper of a Vita-Mix Whole Food Machine. Purified water (0.5 cup) is added to the almonds in the hopper, and the resulting mixture is pureed on Low Variable (I) Power, setting #4 for about 30 seconds. The machine setting is increased to #10, and the mixture is further blended for about one minute. The variable speed is dialed down to #0 and increased to High (II) Power, and the contents are further liquefied for about one minute. The resulting liquefied almond cream is poured into a storage container and set aside. The yield of almond cream is about 1 cup. This 1 cup of cream is then strained through a micro-mesh screen or filter cloth such as Filter fabric FF-4003 and the fine particulate almond mast (about 0.5 cup) is thereby removed. The yield of almond cream, after straining is about 0.5 cup.

Whole raw cashews (0.5 cup) are placed in the hopper of a Vita-Mix Whole Food Machine. Purified water (0.5 cup) is added, and the resulting mixture is pureed on Low Variable (I) power, setting #4 for about 30 seconds. The machine setting is increased to #10, and the mixture is further blended for about 30 seconds. The variable speed is dialed down to #0, and one teaspoon of salt (Table or Kosher); one teaspoon of baking soda and 2.24 oz. of waxy nice starch are added to the hopper. The machine is switched to High (II) Power, and the contents are liquefied for about one minute. The liquefied cashew cream is poured into a storage container and refrigerated. The yield is about 0.75 cups of cashew cream.

The thus prepared cashew cream and almond cream are combined in a container, covered and shaken thoroughly.

Example 6

| Ingredient | Amount |
| --- | --- |
| Raw Cashews | ¼ Cup |
| Raw Almonds | ¼ Cup |
| Purified Water | 1 Cup |
| Waxy Rice Starch | .28 oz. |
| Salt Kosher or table Salt | ⅛ teaspoon |
| Baking Soda | ⅛ teaspoon |

Almonds (0.25 cup) are placed in the hopper of a Vita-Mix Whole Food Machine. Purified water (0.5 cup) is added to the almonds in the hopper, and the resulting mixture is pureed on Low Variable (I) Power, setting #4 for about 30 seconds. The machine setting is increased to #10, and the mixture is further blended for about one minute. The variable speed is dialed down to #0 and increased to High (II) Power, and the contents are further liquefied for about one minute. The resulting liquefied almond cream is poured into a storage container and set aside. The yield is about 0.75 cup of almond cream. This cream is strained through a micro-mesh screen or filter cloth such as Filter fabric FF-4003. The yield of almond cream, after straining is approximately 0.5 cup.

Whole raw cashews (0.25 cup) are placed in the hopper of a Vita-Mix Whole Food Machine. Purified water (0.5 cup) is added, and the resulting mixture is pureed on Low Variable (I) power, setting #4 for about 30 seconds. The machine setting is increased to #10, and the mixture is further blended for about 30 seconds. The variable speed is dialed down to #0, and one teaspoon of salt (Table or Kosher); one teaspoon of baking soda and 2.24 oz. of waxy rice starch are added to the hopper. The machine is switched to High (II) Power, and the contents are liquefied for about one minute. The liquefied cashew cream is poured into a storage container and refrigerated. The yield is about 0.5 cup of cashew cream.

The thus prepared cashew cream and almond cream are combined in a container, covered and shaken thoroughly.

A number of embodiments of the invention have been described. Nevertheless, it will be understood that various modifications may be made without departing from the spirit and scope of the invention. For example, the food product described herein may be processed to form resulting frozen desserts that vary in hardness and consistency, ranging from the more solid consistency of traditional ice cream to the softer consistency of a frozen custard. The food product described herein may also be processed to form non-frozen products that vary in physical form and density, for example from a liquid product having the consistency of heavy cream, light cream or half-and-half to a semisolid product having the consistency of whipped cream. Also, additives known in the art may optionally be added to the compositions, including, for example agents such as, for example, guar gum, lecithin, locust bean gum, xanthan gum and carrageenan that are known to act as thickeners or emulsifiers or to inhibit formation of ice crystals.

Accordingly, other embodiments are within the scope of the following claims.

What is claimed is:

1. A food composition, comprising:
    from about 43% to about 92% by weight of a liquefying agent;
    from about 7% to about 55% by weight of a nut-seed component;
    from about 0.000075% to about 0.1% by weight salt; and
    from about 0.000075% to about 0.1% by weight baking soda.

2. The composition of claim 1, wherein the nut-seed component comprises at least one of a nut butter and a seed butter.

3. A food composition according to claim 2, comprising:
    from about 72% to about 92% by weight of a liquefying agent;
    from about 7% to about 32% by weight of a nut-seed component;
    from about 0.000075% to about 0.1% by weight salt; and
    from about 0.000075% to about 0.1% by weight baking soda.

4. The composition of claim 3, wherein the nut butter comprises an almond butter and the seed butter comprises a cashew butter.

5. The composition of claim 1, further comprising a starch.

6. The composition of claim 5, wherein the starch is present in an amount from about 0.04% to about 6% by weight.

7. The composition of claim 6, wherein the starch is selected from at least one of waxy rice starch, corn starch and tapioca starch.

8. The composition of claim 1, wherein the liquefying agent is water.

9. A food composition, comprising:
from about 72% to about 92% by weight of a liquefying agent;
from about 3.5 to about 16% by weight almonds;
from about 3.5 to about 16% by weight cashews;
wherein the almonds comprise an almond butter and the cashews comprise a cashew butter; and
wherein the liquefying agent, the almonds and the cashews are suitably combined to form a cream;
from about 0.05 to about 0.06% by weight salt;
about 0.09% by weight baking soda; and optionally from about 0.04 to about 0.73% by weight starch;
wherein the cream, the salt, the baking soda and optionally the starch are suitably combined to form a base.

10. The composition of claim 9, wherein the starch is selected from at least one of waxy rice starch, corn starch and tapioca starch.

11. The composition of claim 9, comprising: about 85.09% by weight water, about 7.26% by weight almonds, about 7.26% by weight cashews, about 0.09% by weight baking soda, about 0.055% by weight salt and about 0.1% by weight starch.

12. A method of making a food composition comprising from about 43% to about 92% by weight of a liquefying agent; from about 7% to about 55% by weight of a nut-seed component, wherein the nut-seed component comprises a buffer; from about 0.000075% to about 0.1% by weight salt; and from about 0.000075% to about 0.1% by weight baking soda; the process comprising:
(a) combining the liquefying agent with the nut-seed component to form a cream; and
(b) adding to the cream, the salt and baking soda to form the food composition.

13. The method of claim 12, further comprising adding from about 0.04% to about 6% by weight of a starch.

14. The method of claim 12, wherein the butter comprises at least one of almond butter and cashew butter.

15. A food composition, comprising:
from about 33% to about 84% by weight of a liquefying agent;
from about 4% to about 47% by weight of a nut-seed component, wherein the nut-seed component comprises at least one of a nut butter and a seed butter;
optionally from about 0.01% to about 5% by weight of a starch;
from about 0.000075% to about 0.1% by weight salt;
from about 0.000075% to about 0.1% by weight baking soda; and
from about 6% to about 48% by weight of a sweetening agent;
wherein the liquefying agent and the nut-seed component are suitably combined to form a cream.

16. The food composition according to claim 15, comprising:
from about 68% to about 84% by weight of a liquefying agent;
from about 4% to about 31% by weight of a nut-seed component, wherein the nut-seed component comprises at least one of a nut butter and a seed butter;
optionally from about 0.01% to about 5% by weight of a starch;
from about 0.000075% to about 0.1% by weight salt;
optionally from about 0.000075% to about 0.1% by weight baking soda; and
from about 6% to about 19% by weight of a sweetening agent;
wherein the liquefying agent and the nut-seed component are suitably combined to form a cream.

17. The composition of claim 15, wherein the nut buffer comprises almond butter and the seed butter comprises cashew butter.

18. The composition of claim 15, wherein the liquefying agent is water.

19. The composition of claim 15, wherein the starch is selected from at least one of waxy rice starch, corn starch and tapioca starch.

20. The composition of claim 15 wherein the sweetening agent is selected from at least one of sugar and erythritol.

21. The composition according to claim 20, comprising about 76.9% by weight water, about 6.57% by weight almonds, about 6.57% by weight cashews, about 0.08% by weight baking soda, about 0.05% by weight salt, about 0.17% by weight starch and about 9.52% by weight sugar.

22. The composition according to claim 20, comprising about 78.02% by weight water, about 6.66% by weight almonds, about 6.66% by weight cashews, about 0.085% by weight baking soda, about 0.05% by weight salt, about 0.18% by weight starch and about 8.22% by weight erythritol.

23. A method of making a food composition comprising from about 33% to about 84% by weight of a liquefying agent; from about 4% to about 47% by weight of a nut-seed component comprising at least one of almond butter and cashew butter; from about 0.000075% to about 0.1% by weight salt; from about 0.000075% to about 0.1% baking soda and from about 6% to about 48% by weight of a sweetening agent, the process comprising: (a) combining the nut-seed component with the liquefying agent to form a cream; and (b) adding to the cream formed in step (a), the salt, baking soda and the sweetening agent to form the food composition.

24. The method of claim 23, further comprising adding to the cream formed in step (b) from about 0.01% to about 5% by weight starch.

25. The method of claim 23, wherein the nut-seed component is a mixture of almond butter and cashew butter.

26. The composition of claim 1, wherein the liquefying agent, the nut-seed component, the salt, and the baking soda are suitably combined to form a milk.

* * * * *